June 22, 1965

L. H. CARTER 3,190,674

EMERGENCY TRAILER WHEEL

Filed Oct. 14, 1963

Loyd H. Carter
INVENTOR.

June 22, 1965  L. H. CARTER  3,190,674
EMERGENCY TRAILER WHEEL
Filed Oct. 14, 1963  2 Sheets-Sheet 2
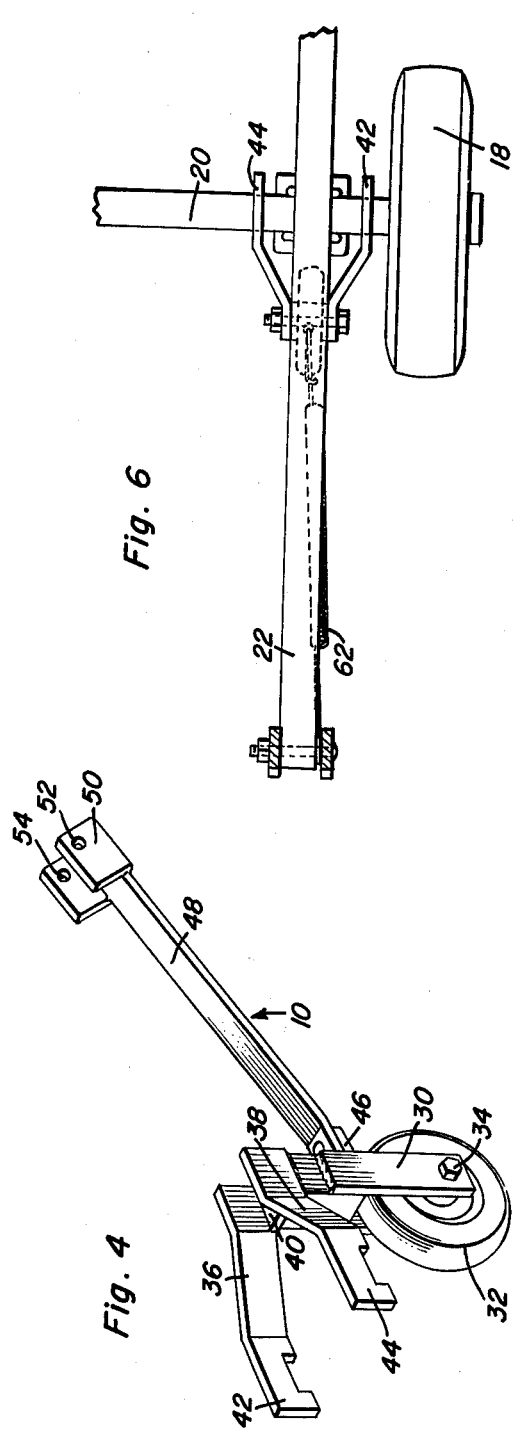
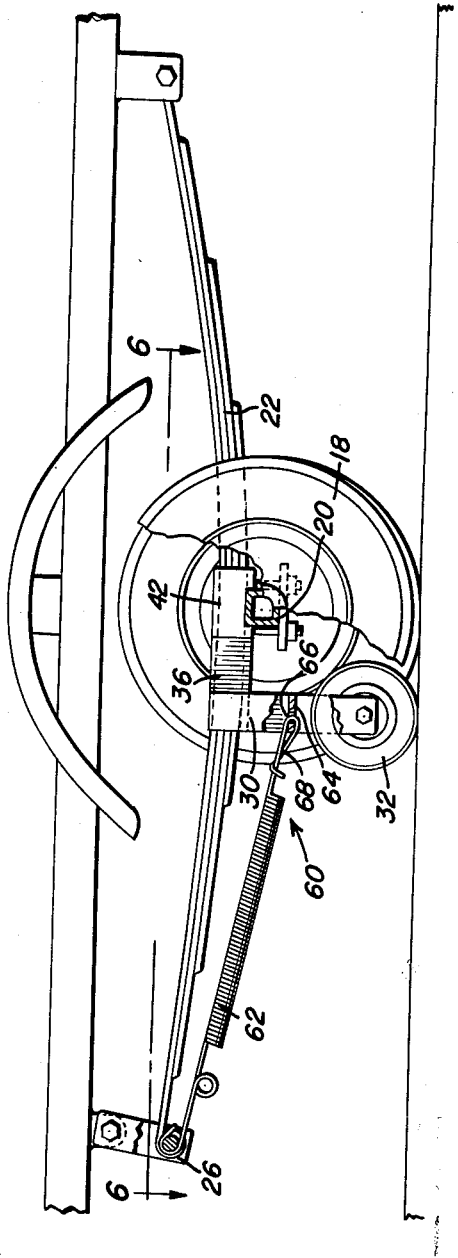
Loyd H. Carter
INVENTOR.

United States Patent Office 3,190,674
Patented June 22, 1965

3,190,674
EMERGENCY TRAILER WHEEL
Loyd H. Carter, Rte. 2, Box 151, North Augusta, S.C.
Filed Oct. 14, 1963, Ser. No. 315,766
8 Claims. (Cl. 280—150)

This invention primarily relates to a spare wheel which may be quickly and easily mounted upon a vehicle trailer when an emergency arises caused by the malfunction of one of the conventional wheels of the trailer.

It is the primary object of this invention to disclose an emergency wheel unit for use with a trailer vehicle and more particularly a boat trailer which may easily be mounted upon the trailer structure without the use of any special tools for installation.

A more specific object of this invention resides in the disclosure of an emergency wheel assembly which is adapted to be quickly installed on a trailer structure by mounting it on the trailer axle by the use of a pair of downwardly facing hook elements carried by the assembly.

Yet another object of this invention resides in a quickly and easily positioned bearing surface on the wheel assembly for supporting the trailer and vehicle load by engagement with a leaf spring of conventional design normally found on such vehicle structures.

A further object of this invention resides in the fact that the emergency wheel assembly has exceptional stability and can be used, due to its design, on either side of the trailer vehicle.

Still another object of this invention resides in the fact that the emergency wheel assembly comprises a minimum number of components, is inexpensive to manufacture but yet is efficient in performance of its function.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view of the emergency wheel assembly shown mounted upon the boat trailer of FIGURES 1 to 3.

FIGURE 5 is a cross sectional view similar to FIGURE 3 but illustrates a slightly modified form of the emergency wheel assembly.

FIGURE 6 is a cross sectional view taken substantially along the plane indicated by the line 6—6 of FIGURE 5.

Figure 1:
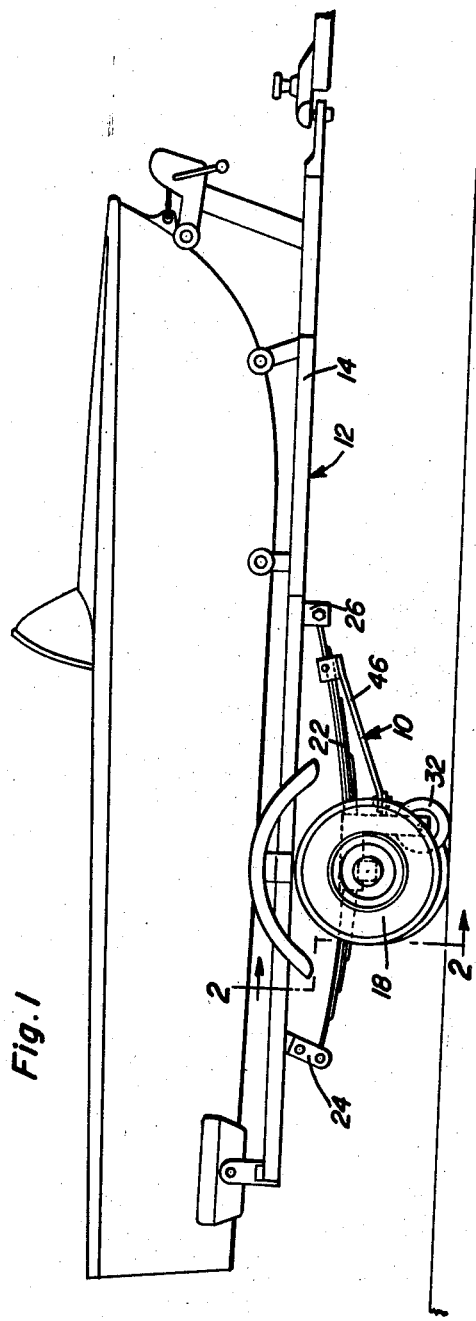
FIGURE 1 is a side elevational view of the emergency wheel assembly mounted in operative use upon a boat trailer structure.

Referring now to the drawings in detail, and in particular to the embodiment of the invention illustrated in FIGURES 1 to 4, the emergency wheel assembly generally designated by the numeral 10 is illustrated in use for supporting a boat trailer of conventional design as designated by the numeral 12. The boat trailer 12 includes a frame 14 supported on the ground surface 16 by a pair of wheels 18 mounted upon a wheel axle 20. A pair of leaf spring assemblies 22 are supported between a pair of spaced spring shackles such as 24 and 26. The leaf spring assemblies 22 cushion shocks imparted to the vehicle and are normally disposed between the trailer frame 14 and the wheel axle 20.

Figure 3:
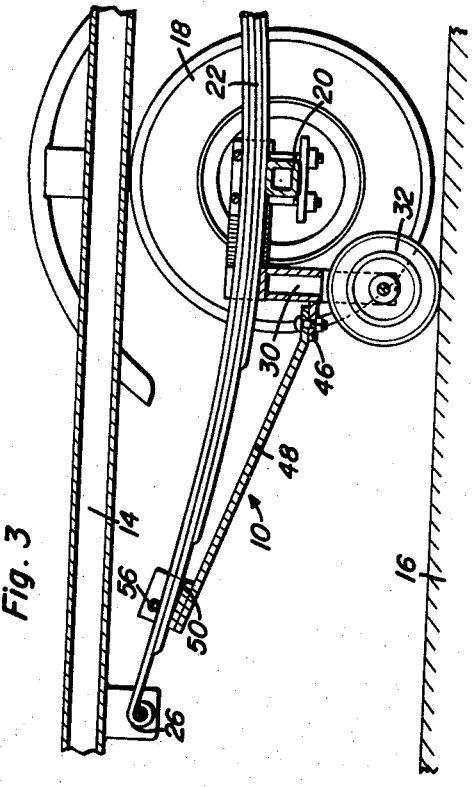
FIGURE 3 is a cross sectional view taken substantially along the plane indicated by the line 3—3 of FIGURE 2.
Figure 2:
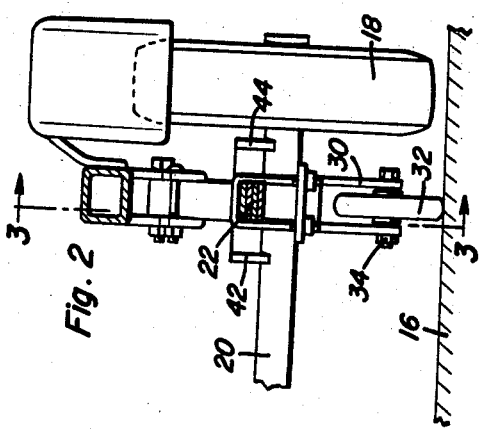
FIGURE 2 is a cross sectional view taken substantially along the plane indicated by the line 2—2 of FIGURE 1 and illustrates the manner of mounting the emergency wheel assembly upon the conventional wheel axle of the boat trailer.

The emergency wheel unit 10 is built to be easily installed upon the wheel axle in the event of some malfunction of the wheels 18. This will usually be due to the wheels becoming flat or a blowout occurring while the trailer is being towed. The emergency wheel assembly 10 includes a yoke 30 straddling the emergency wheel 32. Journal means such as indicated at 34 rotatably mount the wheel 32 between the arms of the yoke 30. The yoke 30 terminates in a pair of rearwardly extending arms 36 and 38 connected by a bridging plate such as 40 closing the top part of the yoke structure. The portions of the arms 36 and 38 adjacent to and in conjunction with the bridging plate 40 form a channel which is adapted to seat one of the leaf spring assemblies 22 and support the weight of the trailer structure as shown in FIGURE 3 when installed on the trailer. The arms 36 and 38 are further angularly offset as shown in FIGURE 4 and terminate in a pair of downwardly opening hooks 42 and 44. The hooks 42 and 44 are adapted to be positioned over the axle 20 for retaining the emergency wheel assembly upon the trailer structure.

Welded or otherwise secured to the arms of the yoke 30 is a plate member 46. Swivelly secured at one of its ends to the plate member 46 is an angular bracing arm 48. At its end remote from the connection to the plate 46, the arm 48 mounts a channel structure 50. The flanges of the channel structure 50 include a pair of aligned apertures 52 and 54 which are adapted to receive a locking pin or bolt such as 56. As shown in FIGURE 3, the channel member 50 is adapted to be positioned in surrounding relation to the leaf spring assembly 22 and held in said encompassing relation whereby the emergency wheel assembly may be braced.

The operation of the emergency wheel assembly illustrated in FIGURES 1 to 4 should now be apparent. Upon a flat tire or blowout occurring, the boat trailer 12 may be jacked up using a conventional auto bumper jack. Then, the emergency wheel may be quickly attached to the axle 20 by positioning the hooks 42, 44 over the axle. The weight of the vehicle trailer may be then supported on the bridging plate 40 by lowering the bumper jack until the leaf spring assembly 22 rests on the bridge plate 40 and the wheel 32 rests upon the ground surface 16. The bracing arm 48 will also support the leaf spring assembly 22 and consequently the weight of the vehicle structure by having the channel 50 in abutting and surrounding relationship therewith. This may be accomplished while the vehicle wheels 18 are off the ground by swiveling the arm 48 into correct alignment with the leaf spring 22 prior to installing and attaching the wheel assembly. When this procedure is completed, the bumper jack may be removed and the boat trailer once again is ready for transportation.

With specific reference to the embodiment of the invention illustrated in FIGURES 5 and 6, the emergency wheel assembly generally indicated by the numeral 60 is almost identical in construction with the emergency wheel assembly 10 and the same numerals are used to indicate like parts. The difference between the two emergency wheel assemblies resides in the fact that in lieu of the bracing arm 48, a coil spring designated by numeral 62 may be used. The spring 62 is adapted to be connected to the spring shackle 26 at one of its ends and to a plate 64 disposed between the arms of the yoke 30 at its other end. The plate 64 is formed with an aperture 66 for receiving the spring end 68 which is looped therethrough. The manner of mounting the emergency wheel assembly 60 is exactly the same as the mode of attaching the wheel assembly 10 except that the coil spring 62 in lieu of being clamped to the leaf spring assembly 22 is connected to the spring shackle 26.

It should thus be apparent that an emergency wheel assembly has been disclosed which due to its simplicity and relatively inexpensive construction, may be used to replace a spare tire. The device requires no more than a bumper jack to install. The device may be used at either side of the vehicle axle and due to its design and cooperation with the leaf springs of the vehicle, the device has exceptional stability.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An emergency wheel assembly for quick attachment to a trailer structure having an axle and a leaf spring comprising in combination, a wheel, upstanding support means rotatably supporting said wheel at its lower end for rotation about a horizontal axis, bracket means including a pair of hooks supported from the upper end portion of said support means for attaching said wheel assembly to the trailer axle, and bearing surface means defined by said upper end portion of said support means for supporting the weight of the trailer structure by engagement with said leaf spring.

2. The assembly of claim 1 including elongated means secured at one end to said support means and at its opposite end to the leaf spring at a point remote from the engagement of the bearing surface means with said leaf spring for bracing the wheel assembly.

3. The assembly of claim 2 wherein said bracing means includes a coil spring.

4. The assembly of claim 2 wherein said bracing means includes an angular arm clamped to the leaf spring.

5. An emergency wheel assembly for quick attachment to a trailer structure having an axle and a leaf spring comprising in combination, a wheel, a yoke straddling the wheel, means rotatably mounting said wheel between said yoke, a channel member connected to the top of the yoke adapted to have said leaf spring seated therein to thereby support the weight of the trailer structure and bracket means for attaching said wheel assembly to the trailer axle, said bracket means including a pair of arms attached to the flanges of the channel member and a pair of hooks on the ends of said arms opening in a direction opposite to the opening of said channel member.

6. The assembly of claim 5 including means secured at one end to the yoke and at its opposite end to the leaf spring for bracing the wheel assembly.

7. The assembly of claim 6 wherein said bracing means includes a coil spring.

8. The assembly of claim 6 wherein said bracing means includes an angular arm clamped to the leaf spring.

References Cited by the Examiner
UNITED STATES PATENTS

| | | | |
|---|---|---|---|
| 1,109,520 | 9/14 | Flower | 280—47.32 |
| 1,756,006 | 4/30 | Marks | 280—150 |

A. HARRY LEVY, *Primary Examiner.*